(12) United States Patent
Miller (10) Patent No.: US 8,566,643 B2
(45) Date of Patent: Oct. 22, 2013

(54) SMALL FORM FACTOR PLUGGABLE (SFP) CHECKING DEVICE FOR READING FROM AND DETERMINING TYPE OF INSERTED SFP TRANSCEIVER MODULE OR OTHER OPTICAL DEVICE

(75) Inventor: Gary Miller, Kearneysville, WV (US)

(73) Assignee: Hubbell Incorporated, Shelton, CT (US)

( * ) Notice: Subject to any disclaimer, the term of this patent is extended or adjusted under 35 U.S.C. 154(b) by 370 days.

(21) Appl. No.: 13/020,760

(22) Filed: Feb. 3, 2011

(65) Prior Publication Data

US 2011/0191632 A1  Aug. 4, 2011

Related U.S. Application Data

(60) Provisional application No. 61/282,410, filed on Feb. 4, 2010.

(51) Int. Cl.
*G06F 11/00* (2006.01)

(52) U.S. Cl.
USPC .......................................................... 714/27

(58) Field of Classification Search
USPC ........ 714/25–32, 36, 37, 39–40, 46, 47.1, 48, 714/57
See application file for complete search history.

(56) References Cited

U.S. PATENT DOCUMENTS

| | | | |
|---|---|---|---|
| 7,024,329 B2 | 4/2006 | Bench et al. | |
| 7,215,889 B2 | 5/2007 | Light | |
| 7,222,313 B2* | 5/2007 | Bullis et al. | 710/8 |
| 7,264,408 B2 | 9/2007 | Togami et al. | |
| 7,281,167 B2 | 10/2007 | Dubé | |
| 7,499,616 B2 | 3/2009 | Aronson et al. | |
| 7,535,851 B2 | 5/2009 | Dubé et al. | |
| 7,614,913 B2 | 11/2009 | Ice | |
| 7,805,514 B2* | 9/2010 | Yang | 709/226 |
| 8,170,829 B1* | 5/2012 | Achkir et al. | 702/122 |
| 2004/0264879 A1 | 12/2004 | McColloch et al. | |
| 2005/0050189 A1* | 3/2005 | Yang | 709/223 |
| 2005/0081023 A1* | 4/2005 | Bullis et al. | 713/1 |
| 2005/0102488 A1 | 5/2005 | Bullis | |
| 2005/0105910 A1 | 5/2005 | Light | |
| 2005/0114083 A1* | 5/2005 | Bullis | 702/183 |
| 2005/0114710 A1 | 5/2005 | Cornell et al. | |
| 2005/0238358 A1 | 10/2005 | Light | |

(Continued)

*Primary Examiner* — Nadeem Iqbal
(74) *Attorney, Agent, or Firm* — Stacey J. Longanecker; Mark S. Bicks; Alfred N. Goodman (57) ABSTRACT

A SFP checking device (SFP Check) connects to a SFP transceiver and a PC or laptop via a USB cable. The SFP Check uses the default web browser of the PC, without an internet connection, to display details of the SFP transceiver such as wavelength, description, range, manufacturer, among other information, in accordance with program code provided to the PC via the SFP Check. All of the information a technician in the field needs to determine which SFP transceiver is the right one for a selected application and optical link is available from the SFP Check. The SFP Check and SFP transceiver both receive power via the USB cable connection to the PC. The SFP Check appears to the PC as a memory stick. A method is provided for determining the drive letter associated with the SFP Check and the program coder or file(s) it provides to the PC.

16 Claims, 12 Drawing Sheets

(56) References Cited

U.S. PATENT DOCUMENTS

| | | |
|---|---|---|
| 2005/0265717 A1 | 12/2005 | Zhou |
| 2006/0093280 A1 | 5/2006 | McColloch et al. |
| 2006/0093365 A1 | 5/2006 | Dybsetter et al. |
| 2006/0189220 A1 | 8/2006 | Duval et al. |
| 2006/0269196 A1 | 11/2006 | Tamanuki et al. |
| 2006/0291857 A1* | 12/2006 | Mackenzie et al. ............... 398/9 |
| 2009/0016685 A1 | 1/2009 | Hudgins et al. |
| 2009/0052903 A1 | 2/2009 | Mussatt et al. |
| 2009/0060425 A1 | 3/2009 | Aronson |
| 2009/0303883 A1 | 12/2009 | Kucharczyk et al. |
| 2010/0280858 A1* | 11/2010 | Bugenhagen ..................... 705/7 |

* cited by examiner

SFP CHECK

THE SFP CHECK IS USED TO TEST CLASS 1 LASER PRODUCT. PLEASE TAKE APPROPRIATE PRECAUTIONS.

| IDENTIFICATION | ID RAW DATA | DIAGNOSTICS | DIAG RAW DATA | REFERENCES |

← DIAGNOSTICS IMPLEMENTED →

THIS PAGE DOES NOT AUTOMATICALLY REFRESH WHEN A NEW SFP IS INSTALLED.
AFTER INSTALLING A NEW SFP, WAIT FOR THE LIGHT OF THE SFP CHECK TO GO OFF AND BACK ON.
THEN CLICK THE REFRESH BUTTON ON YOUR BROWSER OR CLICK THIS BUTTON:

[REFRESH]

HARDWARE STATUS AND CONTROL

|  | SFP PRESENT | Rx LOSS OF SIGNAL | Tx FAULT | Tx DISABLE | RATE SELECT |
|---|---|---|---|---|---|
| LOGIC LEVEL -> | 0 | 0 | 0 | 0 | 1 |
|  | SFP INSTALLED | Rx SIGNAL OK | Tx LASER OK | Tx LASER ON | SEE THE DATA SHEET FOR THIS SFP FOR FUNCTION (IF ANY) |
| SFP MODULE CURRENT CONSUMPTION -> | | | | | 228 ma |

BASIC SFP IDENTIFIER

| CAPABILITY | CONNECTOR | WAVELENGTH | MANUFACTURER | SERIAL NUMBER |
|---|---|---|---|---|
| DWDM SFP | LC OPTICAL | 1546.92 nm | OCP | 2889111 |
| INVALID EXT ID: 36 EXT ID SHOULD BE 4 OC48 | REACH | ORGANIZATION UNIQUE ID | PART NUMBER | REVISION |
| | SONET LR-2 | 00.0A.1D | TRPW48L2OB380 | 0000 |
| | 80km ON SMF<br>7000m ON SMF | --- | LOT CODE | DATE CODE |
| | 2510m ON MMF, 50um, OM2<br>860m ON MMF, 62.5um, OM1<br>650m ON MMF, 50um, OM3 | --- | | APR. 18, 2007 |

FIG. 5

SFP CHECK

WARNING: THE SFP CHECK CAN TEST
CLASS 1 LASERS. USE APPROPRIATE PRECAUTIONS.

| IDENTIFICATION | ID RAW DATA | DIAGNOSTICS | DIAG RAW DATA | REFERENCES |
|---|---|---|---|---|

← DIAGNOSTICS NOT IMPLEMENTED →

THIS PAGE DOES NOT AUTOMATICALLY REFRESH WHEN A NEW SFP IS INSTALLED.
AFTER INSTALLING A NEW SFP, WAIT FOR THE LIGHT OF THE SFP CHECK TO GO OFF AND BACK ON.
THEN CLICK THE REFRESH BUTTON ON YOUR BROWSER OR CLICK THIS BUTTON:

[ REFRESH ]

HARDWARE STATUS AND CONTROL

|  | SFP PRESENT | Rx LOSS OF SIGNAL | Tx FAULT | Tx DISABLE | RATE SELECT |
|---|---|---|---|---|---|
| LOGIC LEVEL -> | 0 | 1 | 0 | 0 | 1 |
|  | SFP INSTALLED | Rx SIGNAL LOST | Tx LASER OK | Tx LASER ON | SEE THE DATA SHEET FOR THIS SFP FOR FUNCTION (IF ANY) |

BASIC SFP IDENTIFIER

| CAPABILITY | CONNECTOR | WAVELENGTH | MANUFACTURER | SERIAL NUMBER |
|---|---|---|---|---|
| ETH: 1000BASE-LX | LC OPTICAL | 1310 nm | OCP | 2869376 |
|  | REACH | ORGANIZATION UNIQUE ID | PART NUMBER | REVISION |
|  | 10km ON SMF 10000m ON SMF | 00.0A.1D | TRPNG1LXDABS |  |
|  |  | --- | LOT CODE | DATE CODE |
|  |  | --- |  | OCT. 22, 2004 |

FIG. 6

CONTENTS OF SFP PAGE A0 (ID) — 70

| ADDR | HEX | DEC | ASCII | DESCRIPTION |
|---|---|---|---|---|
| 0 | 0x03 | 3 | !etx! | IDENTIFIER: EITHER SFP OR SFP+ TYPE |
| 1 | 0x04 | 4 | !eot! | EXTENDED ID. CORRECT FOR SFP |
| 2 | 0x07 | 7 | !bel! | CONNECTOR TYPE: LC OPTICAL |
| 3 | 0x00 | 0 | !nul! | NO 10G OR INFINIBAND CAPABILITY |
| 4 | 0x00 | 0 | !nul! | NO ESCON CAPABILITY |
| 5 | 0x00 | 0 | !nul! | NO OC3 OR OC12 CAPABILITY |
| 6 | 0x02 | 2 | !stx! | ETH: 1000BASE-LX |
| 7 | 0x00 | 0 | !nul! | NO FIBER CHANNEL LENGTH NO FIBRE CHAN TECHNOLOGY |
| 8 | 0x00 | 0 | !nul! | NO SFP+ CABLE TECHNOLOGY |
| 9 | 0x00 | 0 | !nul! | NO FIBER CHANNEL TRANSMISSION MEDIA SPECIFIED |
| 10 | 0x00 | 0 | !nul! | FIBER CHANNEL DATA RATE IS UNSPECIFIED |
| 11 | 0x01 | 1 | !soh! | ENCODING IS 8B/10B |
| 12 | 0x0d | 13 | !cr! | NOMINAL BIT RATE= 1300 Mbps |
| 13 | 0x00 | 0 | !nul! | UNSPECIFIED RATE SELECT FUNCTIONALITY |
| 14 | 0x0a | 10 | !lf! | REACH ON SINGLE MODE FIBER=10km |
| 15 | 0x64 | 100 | d | REACH ON SINGLE MODE FIBER=10000METERS |
| 16 | 0x00 | 0 | !nul! | EITHER MULTIMODE 50um FIBER NOT SUPPORTED OR REACH IS SPECIFIED ABOVE |
| 17 | 0x00 | 0 | !nul! | EITHER 62.5UM MULTIMODE FIBER NOT SUPPORTED OR REACH IS SPECIFIED ABOVE |
| 18 | 0x00 | 0 | !nul! | EITHER COPPER NOT SUPPORTED OR REACH IS SPECIFIED IN THE TECHNOLOGY SECTION ABOVE |
| 19 | 0x00 | 0 | !nul! | EITHER 50um, OM3 MULTIMODE FIBER NOT SUPPORTED OR REACH IS SPECIFIED ABOVE |
| 20 | 0x4f | 79 | O | MANUFACTURER'S NAME |
| 21 | 0x43 | 67 | C | MANUFACTURER'S NAME |
| 22 | 0x50 | 80 | P | MANUFACTURER'S NAME |
| 23 | 0x20 | 32 |   | MANUFACTURER'S NAME |
| 24 | 0x20 | 32 |   | MANUFACTURER'S NAME |
| 25 | 0x20 | 32 |   | MANUFACTURER'S NAME |
| 26 | 0x20 | 32 |   | MANUFACTURER'S NAME |
| 27 | 0x20 | 32 |   | MANUFACTURER'S NAME |
| 28 | 0x20 | 32 |   | MANUFACTURER'S NAME |

FIG. 7

SFP CHECK

WARNING: THE SFP CHECK CAN TEST
CLASS 1 LASERS. USE APPROPRIATE PRECAUTIONS.

| IDENTIFICATION | ID RAW DATA | DIAGNOSTICS | DIAG RAW DATA | REFERENCES |

←—— DIAGNOSTICS IMPLEMENTED ——→

THIS PAGE CAN AUTOMATICALLY REFRESH. SELECT THE DESIRED OPTION BELOW.
⊙ MANUAL REFRESH    ○ REFRESH EVERY 10 SECONDS    ○ REFRESH EVERY 20 SECONDS

[ MANUAL REFRESH ]

MEASURED VALUES, ALARMS, AND WARNING (DIAGNOSTICS)

|  | TEMP | VOLTAGE | REV LEVEL | REV LEVEL | Xmt LEVEL | Xmt LEVEL | LASER BIAS |
|---|---|---|---|---|---|---|---|
| UNITS -> | DEG C | VOLTS | MILLIWATT | dBm | MILLIWATT | dBm | ma |
| MEASURED: | +27.8 | 3.29 | 0.0000 | -INFINITY | 0.8993 | -0.5 | 16.5 |
| ALARM LOW: | -31.0 | 3.11 | 0.0141 | -18.5 | 0.2820 | -5.5 | 8.0 |
| WARNING LOW: | -29.0 | 3.13 | 0.0158 | -18.0 | 0.3160 | -5.0 | 9.0 |
| WARNING HIGH: | +93.0 | 3.48 | 1.1220 | +0.5 | 1.0000 | +0.0 | 75.0 |
| ALARM HIGH: | +95.0 | 3.50 | 1.2020 | +0.8 | 1.0720 | +0.3 | 78.0 |

FIG. 8

THIS PAGE CAN AUTOMATICALLY REFRESH. SELECT THE DESIRED OPTION BELOW.
⊙ MANUAL REFRESH    ○ REFRESH EVERY 10 SECONDS    ○ REFRESH EVERY 20 SECONDS

[MANUAL REFRESH]

CONTENTS OF SFP PAGE A2 (DIAGNOSTICS)

| ADDR | HEX | DEC | ASCII | DESCRIPTION |
|---|---|---|---|---|
| 0 | 0x5f00 | 24320 | _!nul! | TEMPERATURE HIGH ALARM. TEMPERATURE=+95.0C |
| 2 | 0xe100 | 57600 | -x-!nul! | TEMPERATURE LOW ALARM. TEMPERATURE=-31 0C |
| 4 | 0x5d00 | 23808 | ]!nul! | TEMPERATURE HIGH WARNING. TEMPERATURE=+93 0C |
| 6 | 0xe300 | 58112 | -x-!nul! | TEMPERATURE LOW WARNING. TEMPERATURE=-29 0C |
| 8 | 0x8886 | 34950 | -x--x- | VOLTAGE HIGH ALARM. VOLTAGE=3.50 |
| 10 | 0x797c | 31100 | y| | VOLTAGE LOW ALARM. VOLTAGE=3.11 |
| 12 | 0x87f0 | 34800 | -x--x- | VOLTAGE HIGH WARNING. VOLTAGE=3.48 |
| 14 | 0x7a12 | 31250 | z!dc2! | VOLTAGE LOW WARNING. VOLTAGE=3.13 |
| 16 | 0x9858 | 39000 | -x-X | LASER BIAS HIGH ALARM. CURRENT=78.0ma |
| 18 | 0x0fa0 | 4000 | !s1!-x- | LASER BIAS LOW ALARM. CURRENT=8.0ma |
| 20 | 0x927c | 37500 | -x-| | LASER BIAS HIGH WARNING. CURRENT=75.0ma |
| 22 | 0x1194 | 4500 | !dc1!-x- | LASER BIAS LOW WARNING. CURRENT=9.0ma |
| 24 | 0x29e0 | 10720 | )-x- | TRANSMIT POWER HIGH ALARM. POWER=1.0720mW |
| 26 | 0x0b04 | 2820 | !vt! !eot! | TRANSMIT POWER LOW ALARM. POWER=0.2820mW |
| 28 | 0x2710 | 10000 | /'!dle! | TRANSMIT POWER HIGH WARNING. POWER=1.0000mW |
| 30 | 0x0c58 | 3160 | !ff!X | TRANSMIT POWER LOW WARNING. POWER=0.3160mW |
| 32 | 0x2ef4 | 12020 | .-x- | RECEIVE POWER HIGH ALARM. POWER=1.2020mW |
| 34 | 0x008d | 141 | !nul!-x- | RECEIVE POWER LOW ALARM. POWER=0.0141mW |
| 36 | 0x2bd4 | 11220 | +-x- | RECEIVE POWER HIGH WARNING. POWER=1.1220mW |
| 38 | 0x009e | 158 | !nul!-x- | RECEIVE POWER LOW WARNING. POWER=0.0158mW |
| 40 | 0x0000 | 0 | !nul! !nul! | UNALLOCATED, BUT RESERVED FOR FUTURE MONITORED VALUES |

FIG. 9

| | | | | CALIBRATION CONSTANTS FOR EXTERNAL CALIBRATION |
|---|---|---|---|---|
| 56 | 0x00000000 | 0 | !nul! !nul! !nul! !nul! | IEEE-754 FLOATING POINT NUMBER IN 4 BYTES. VALUE=0.0 |
| 60 | 0x00000000 | 0 | !nul! !nul! !nul! !nul! | IEEE-754 FLOATING POINT NUMBER IN 4 BYTES. VALUE=0.0 |
| 64 | 0x00000000 | 0 | !nul! !nul! !nul! !nul! | IEEE-754 FLOATING POINT NUMBER IN 4 BYTES. VALUE=0.0 |
| 68 | 0x3f800000 | 1065353216 | ?-x-!nul! !nul! | IEEE-754 FLOATING POINT NUMBER IN 4 BYTES. VALUE=2 |
| 72 | 0x00000000 | 0 | !nul! !nul! !nul! !nul! | IEEE-754 FLOATING POINT NUMBER IN 4 BYTES. VALUE=0.0 |
| 76 | 0x0100 | 256 | !soh! !nul! | LASER BIAS CURRENT SLOPE=1.000 |
| 78 | 0x0000 | 0 | !nul! !nul! | LASER BIAS CURRENT OFFSET=0.0ma |
| 80 | 0x0100 | 256 | !soh! !nul! | TRANSMIT POWER SLOPE=1.000 |
| 82 | 0x0000 | 0 | !nul! !nul! | TRANSMIT POWER OFFSET=0.0000mW |
| 84 | 0x0100 | 256 | !soh! !nul! | TEMPERATURE SLOPE=1.000 |
| 86 | 0x0000 | 0 | !nul! !nul! | TEMPERATURE OFFSET=+0.0C |
| 88 | 0x0100 | 256 | !soh! !nul! | VOLTAGE SLOPE=1.000 |
| 90 | 0x0000 | 0 | !nul! !nul! | VOLTAGE OFFSET=0.00V |
| 92 | 0x0000 | 0 | !nul! !nul! | UNALLOCATED LOCATION |
| 94 | 0x00 | 0 | !nul! | UNALLOCATED LOCATION |
| 95 | 0x9a | 154 | -x- | CHECKSUM FOR LOCATIONS 0-94 OF PAGE A2 |

FIG. 10

| MEASURED DIAGNOSTIC VALUES | | | | |
|---|---|---|---|---|
| 96 | 0x2efe | 12030 | .-x- | UNCALIBRATED TEMPERATURE=+46.9C |
| 98 | 0x80a0 | 32928 | -x-x- | UNCALIBRATED VOLTAGE=3.29V |
| 100 | 0x28d6 | 10454 | (-x- | UNCALIBRATED LASER BIAS CURRENT=20.9ma |
| 102 | 0x234a | 9034 | #J | UNCALIBRATED TRANSMIT POWER=0.9034mW |
| 104 | 0x0000 | 0 | !nul! !nul! | UNCALIBRATED RECEIVE POWER=0.0000mW |
| 106 | 0x0000 | 0 | !nul! !nul! | UNALLOCATED, BUT RESERVED FOR FUTURE MONITORED VALUE |
| 108 | 0x0000 | 0 | !nul! !nul! | UNALLOCATED, BUT RESERVED FOR FUTURE MONITORED VALUE |

| | | | | END OF MEASURED VALUES |
|---|---|---|---|---|
| 110 | 0xaf | 175 | -x- | OPTIONAL STATUS AND CONTROL BITS<br>TRANSCEIVER IS NOT READY TO PROVIDE MEASURED DATA<br>RECEIVE LOSS OF SIGNAL<br>TRANSMIT FAULT=1<br>SOFT RATE SELECT CONTROL RS(1) AND RS(0)=11<br>RATE SELECT PIN=0<br>SOFT TRANSMIT DISABLE=0<br>TRANSMIT DISABLE PIN=1 |
| 111 | 0x00 | 0 | !nul! | UNALLOCATED |
| 112 | 0x0040 | 64 | !nul!@ | RECEIVE POWER LOW ALARM |
| 114 | 0x0000 | 0 | !nul! !nul! | UNALLOCATED |
| 116 | 0x0040 | 64 | !nul!@ | RECEIVE POWER LOW WARNING |
| 118 | 0x0000 | 0 | !nul! !nul! | OPTIONAL EXTENDED CONTROL AND STATUS<br>SOFT RS(1) SELECT = 0<br>POWER STATE = 1.0 WATTS MAX<br>POWER CONTROL = 1.0 WATTS MAX |
| 119 | 0x00 | 0 | !nul! | UNALLOCATED |
| 120 | 0x00 | 0 | !nul! | VENDOR SPECIFIC |
| 121 | 0x00 | 0 | !nul! | VENDOR SPECIFIC |
| 122 | 0x00 | 0 | !nul! | VENDOR SPECIFIC |
| 123 | 0x00 | 0 | !nul! | VENDOR SPECIFIC |
| 124 | 0x00 | 0 | !nul! | VENDOR SPECIFIC |
| 125 | 0x00 | 0 | !nul! | VENDOR SPECIFIC |
| 126 | 0x00 | 0 | !nul! | VENDOR SPECIFIC |
| 127 | 0x00 | 0 | !nul! | VENDOR SPECIFIC |

SMALL FORM FACTOR PLUGGABLE (SFP) CHECKING DEVICE FOR READING FROM AND DETERMINING TYPE OF INSERTED SFP TRANSCEIVER MODULE OR OTHER OPTICAL DEVICE

This application claims the benefit of U.S. provisional application Ser. No. 61/282,410, filed Feb. 4, 2010, the entire contents of which are incorporated herein by reference.

BACKGROUND OF THE INVENTION

1. Field of the Invention

The present invention relates generally to a portable testing device for reading small form-factor pluggable (SFP) or Mini-GBIC transceiver modules. In particular, the present invention relates to a system and method for a SFP Check that reads and decodes data from any type of SFP module to determine its SFP module-type.

2. Description of Related Art

Figure 1:
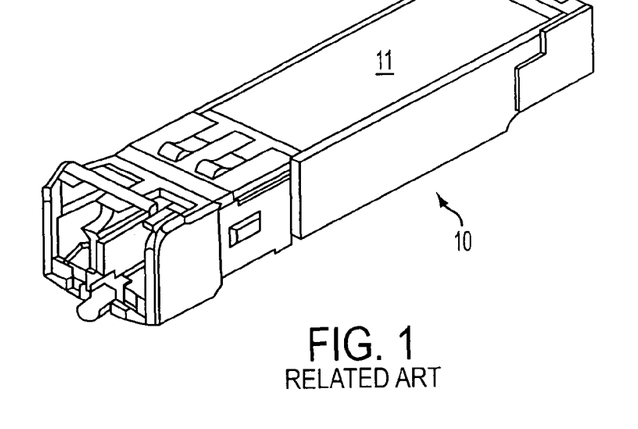
FIG. 1 depicts an illustrative SFP transceiver module.
Figure 2:
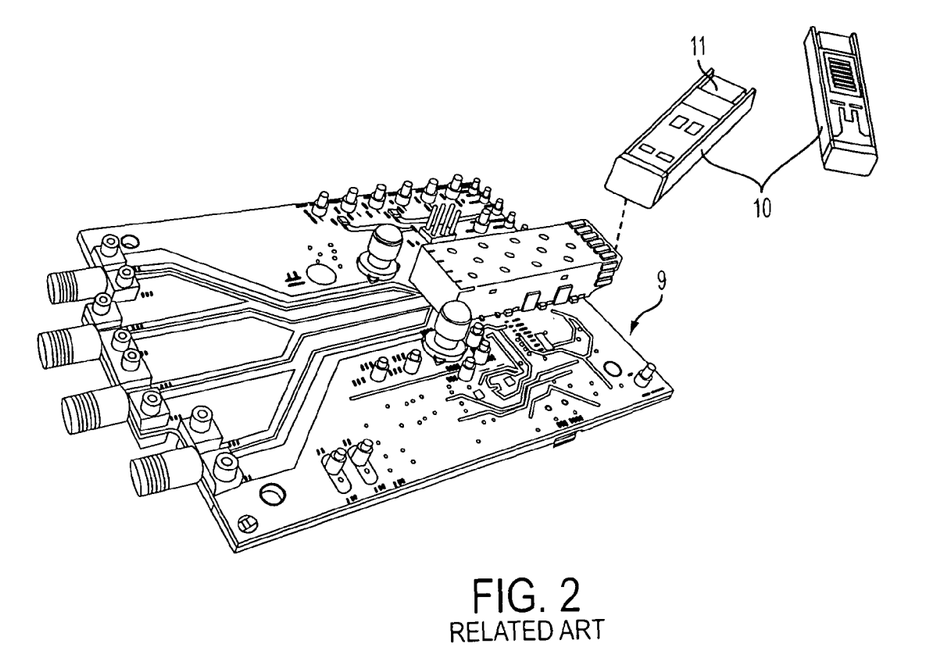
FIG. 2 depicts an illustrative bench top pattern test board for SFP transceiver modules.

With reference to FIGS. 1 and 2, a small form-factor pluggable (SFP) or Mini-GBIC transceiver module 10 is a compact, hot-pluggable transceiver used for both telecommunication and data communications applications. The SFP transceiver module 10 interfaces a network device mother board (e.g., for a switch, router, media converter or similar device) to a fiber optic or copper networking cable. SFP transceiver modules 10 are designed to support SONET, Gigabit Ethernet, Fibre Channel, and other communications standards. The SFP module was designed after the GBIC interface, and allows greater port density (e.g., a greater number of transceivers per cm along the edge of a mother board) than the GBIC, which is why a SFP is also known as a mini-GBIC.

SFP transceiver modules 10 are available with a variety of different transmitter and receiver types, allowing users to select the appropriate transceiver 10 for each link to provide the optical transmission characteristics required over the available optical fiber type (e.g., multi-mode fiber or single-mode fiber). Optical SFP modules 10 are available in several different categories such as, for example:

850 nm 550 m multi-mode fiber (SX)
1310 nm 10 km single-mode fiber (LX)
1490 nm 10 km single-mode fiber (BS-D)
1550 nm [40 km (XD), 80 km (ZX), 120 km (EX or EZX)] DWDM SFP transceivers modules 10 are also available with a copper cable interface, allowing a host device designed primarily for optical fiber communications to also communicate over unshielded twisted pair networking cable. There are also CWDM and single-fiber "bi-directional" (1310/1490 nm Upstream/Downstream) SFPs.

SFP transceivers modules 10 are commercially available with capability for data rates up to 4.25 Gbit/s. The standard is expanding to SFP+ which for supporting data rates up to 10.0 Gbit/s (that will include the data rates for 8 gigabit Fibre Channel, 10 GbE, and OTU2). SFP+ module versions for optics as well as copper are being introduced. In comparison to Xenpak, X2 or XFP type of modules, SFP+ modules leave some of the circuitry to be implemented on the host board instead of inside the module. The related Small Form Factor (SFF) transceiver is similar in size to the SFP, but is soldered to the host board as a pin through-hole device, rather than plugged into an edge-card socket.

The SFP transceiver module 10 is specified by a multi-source agreement (MSA) between competing manufacturers. One specification, for example, is the INF-8074i, which is sometimes referred to as the SFP MSA. SFP transceiver modules that are designed to this specification will allow the display of identification characteristics such as wavelength, type, range, vendor, part number, and date code. Another illustrative specification is SFF-8472, which provides specifications for a diagnostic monitoring interface for optical transceivers. SFP transceiver modules that are designed to this specification support the display of identification characteristics and diagnostic characteristics such as transmit and receive levels, laser bias current, voltage and temperature.

However, as a practical matter, the SFP transceiver modules 10 of some networking equipment manufacturers are not compatible with "generic" or MSA SFP transceiver modules because a check in the SPF module's firmware has been added that will only enable that vendor's own modules. The availability of incompatible SFP transceiver modules 10 makes replacement of a SPF transceiver module in an optical link difficult for a user (e.g., a user in the field repairing optical pathways) since replacement of a non-standard SPF transceiver module 10 with an incompatible transceiver module 10 will not suffice. Thus, a need exists for a portable SPF checking device into which a SFP transceiver modules 10 (e.g., a possible replacement SFP transceiver module) can be successively inserted to quickly and easily determine their respective vendors or vendor-specific specifications until the correct vendor's SFP transceiver module or otherwise compatible SFP transceiver module is located (e.g., from among many SFP transceiver modules carried by the user in the field) for use as a replacement.

Since the SFP transceiver module 10 is such a small optical device, there is little room on it for labeling. For example, a SFP transceiver module label 11 may indicate only a vendor name and/or a part number but no other characteristics such as laser power, transmit wavelength, transmit power, receiver sensitivity and other characteristics that would otherwise only be known if a data sheet for the SFP transceiver module were available. This is often not the case. In fact, data sheets are seldom available in the field and users often have dozens of SFP transceiver modules from different vendors in a box when doing repairs to optic pathways in the field and therefore have no way of knowing the respective SFP transceiver modules' characteristics without a reader or checker. The characteristics of SFP transceiver modules must be known in order to place the proper type of SFP transceiver module in an optical pathway under repair (e.g., some fiber pathways require a vendor-specific SFP transceiver module in order to function properly). Thus, a need exists for a reader or checker for SFP transceiver modules 10 that can quickly and easily determine an SFP transceiver module's characteristics. Some pattern test boards do exist for SFP transceiver modules such as the MSA transceiver testing device described in U.S. Patent Application Publication No. 2006/0189220 of Duval et al. Prior to putting MSA transceivers on the market for sale, transceivers are tested for quality control purposes. Since the types of the tested transceivers is already known, these pattern test boards are preconfigured to read only selected transceiver types. More specifically, they typically have several different sized cable connections for pattern and data rate testing of devices with known characteristics (e.g., an integrated pattern generator is used to verify the pattern of a known device to allow testing of devices to see if they meet specifications). Thus, the characteristics of the tested device are already known, or the tested device is known to be one of a small set of preselected types for which the pattern test board is preconfigured, and the characteristics of the tested device are merely being verified.

Further, some existing pattern test boards require an external power supply. Some of these test boards may also have no box or integrated housing and so they are merely intended for bench top checks only. See for, example, an evaluator board for testing a printed circuit board assembly device subcomponents disclosed in U.S. Pat. No. 7,024,329 and the illustrative test board 9 depicted in FIG. 2. Again, these devices do not determine and indicate to a user the type and characteristics of the tested component when its type is unknown.

A need therefore also exists for an SFP reader or checker for SFP transceiver modules or other SFP devices that can determine the characteristics of essentially any SFP module in the field (e.g., at a remote building telecommunications cabinet) as opposed to only at a bench top, and can determine these characteristics regardless of whether the SFP module type is known or not For example, a need exists for a SFP reader or checker that is portable and enclosed in a housing for use in the field, and has either an integrated power supply or can receive power for itself and a test device when the SFP reader or checker is connected to another device in the field. Further, a need exists for a portable SFP reader or checker that can read the characteristics of essentially any SFP transceiver, particularly when the SFP module type (e.g., vendor, part number and characteristics) is unknown, and conveniently display them for a user such as on a personal computer or laptop from which the SFP reader can also derive power for itself and the tested device.

SUMMARY OF THE INVENTION

The above and other problems are overcome, and additional advantages are realized by illustrative embodiments of the present invention.

In accordance with an illustrative embodiment of the present invention, a testing apparatus for SFP devices (e.g., a SFP Check) connects to a SFP transceiver module and to a standard PC or laptop via a USB cable. The SFP Check uses the default web browser of the PC, without requiring an interne connection, to display SFP details of the SFP transceiver such as wavelength, description, range, manufacturer, among other information, in accordance with program code provided to the PC via the SFP Check. All of the information a technician in the field needs to determine which SFP module is the right one for a selected application and optical link is available from the SFP Check. The SFP check and SFP module both receive power via the USB cable connection to the PC. The SFP Check appears to the PC as a memory stick. A method is provided for determining the drive letter associated with the SFP Check and the program code or file(s) it provides to the PC.

In accordance with aspects of illustrative embodiments of the present invention, a testing apparatus for small form factor pluggable or SFP devices comprises: an interface for connecting to an SFP device, the interface being configured to connect to any one of a plurality of SFP-types and regardless of whether the SFP-type is unknown prior to connecting; a connector configured to connect the testing apparatus to a computer and receive power for the testing apparatus and the SFP device from the computer; and a processing device configured to read information from a memory device in the SFP device, decode the information, and store the information in at least one file. The processing device is programmed via an SFP device reader software application to provide the file to the computer, and to provide the computer with instructions to access the file and to display at least a portion of the information provided in the file on a computer display.

In accordance with other aspects of illustrative embodiments of the present invention, the connector is a USB connector. The connector is preferable configured to deliver power the testing apparatus and the SFP device under test from the computer.

In accordance with additional aspects of illustrative embodiments of the present invention, the SFP device reader software application is configured to run either from the testing apparatus, or is configured to instruct the computer to run a browser from the computer without connection to a network to access the file provided via the SFP device reader software application. For example, the SFP device reader software application can be configured to instruct the computer to generate HTML pages without connection to a network to indicate the SFP device characteristics using the information obtained from the memory device in the SFP device. The SFP device reader software application indicates the testing device as a memory stick to the computer.

In accordance with other aspects of illustrative embodiments of the present invention, the testing apparatus further comprises a housing unit. The interface comprises a second connector provided on the housing unit to connect to the SFP device. The housing unit encloses the testing apparatus and the connector and second connector are ports to the housing unit. The testing apparatus enclosed in the housing unit is portable. The housing unit comprises a power circuit to power components in the testing apparatus components and the SFP device under test.

In accordance with additional aspects of illustrative embodiments of the present invention, the SFP device reader software application is operable to assign the testing apparatus a drive letter and operate the testing apparatus as a small Flash drive when the SFP device is connected to the interface. The SFP device reader software application is operable to control the computer to generate at least one screen on the computer display to indicate at least part of the information read from the memory device in the SFP device.

BRIEF DESCRIPTION OF THE DRAWINGS

The invention will be more readily understood with reference to the illustrative embodiments thereof illustrated in the attached drawing figures, in which.

Throughout the drawing figures, like reference numbers will be understood to refer to like elements, features and structures.

DETAILED DESCRIPTION OF ILLUSTRATIVE EMBODIMENTS

Figure 3:
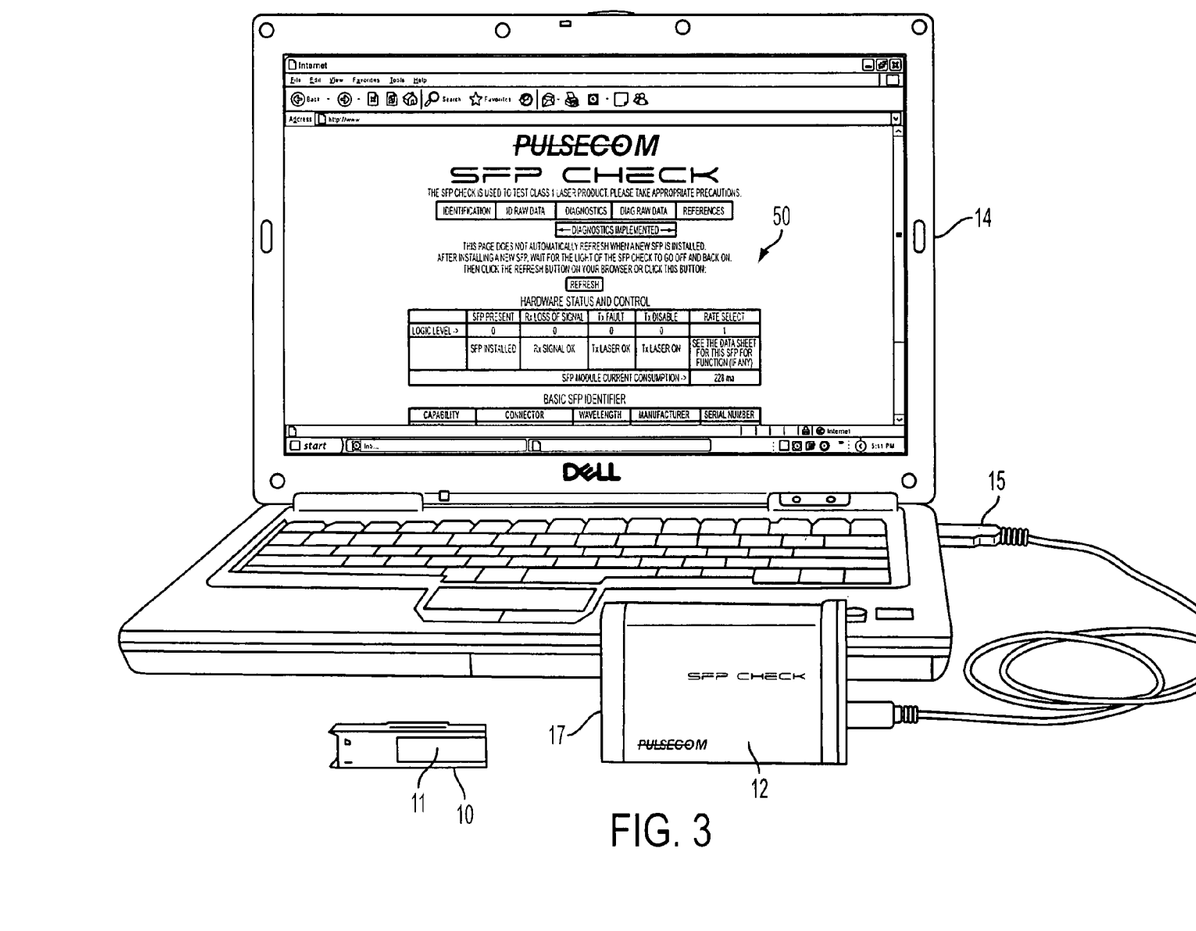
FIG. 3 depicts an illustrative SFP Check connected to a SFP transceiver module and to a computing device in accordance with an illustrative embodiment of the present invention.
Figure 13A:
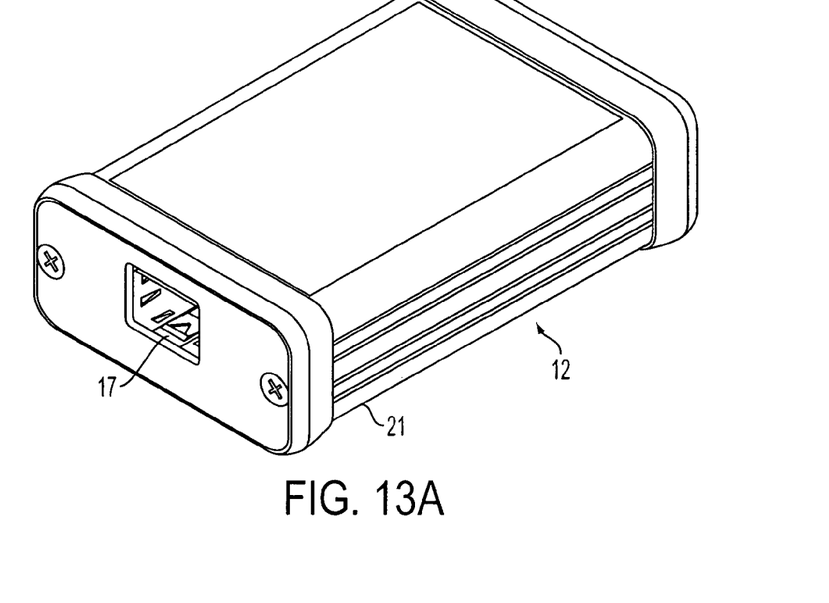
FIGS. 13A and 13B are respective isometric exterior views of a SFP Check in accordance with an illustrative embodiment of the present invention.

In accordance with an illustrative embodiment of the present invention and with reference to FIGS. 3 and 4, a SFP reader or checker 12 (hereinafter a "SFP Check" 12) is provided which is a portable, user-friendly test fixture for Small Formfactor Pluggable (SFP) transceiver modules 10 (hereinafter referred to generally as "SFP modules"). The SFP Check 12 allows an operator or user to determine the characteristics coded into a SFP module 10 connected thereto (e.g., detachably inserted or otherwise connected via a connector 17 on the SFP Check 12 as shown in FIG. 13A), and to perform basic functional testing of SFP devices with optical interfaces, as described in more detail below.

The SFP Check 12 can read the characteristics of essentially any SFP transceiver module 10, particularly when the SFP module type (e.g., vendor, part number and characteristics) is unknown, and conveniently display these characteristics for a user such as on a personal computer 14 or laptop from which the SFP reader 12 (hereinafter referred to as the "SFP Check") can also derive power for itself and the tested device 10.

More specifically, a SFP Check 12 reads the contents of a memory 13 that exists in a SFP module 10. The basic requirements of the SFP module 10 are given, for example, in the specifications INF-8074 and SFF-8472 published by the Small Formfactor Committee and available from www.sff-committee.com. It is to be understood that the SFP Check 12 can be configured to read the contents of other types of MSA devices or transceiver modules 10 (e.g., Small Form Factor (SFF), Gigabit interface (GBIC), 300 Pin MSA, XENPAK, Xpak/X2, High Speed Form Factor Pluggable (XFP), among others.

As stated above, since a SFP module 10 is so small, and there is little room for labeling on the SFP module, it is often difficult to determine the functionality of an SFP module by merely reading the limited amount of information provided on a SFP module label 11. Even when it is obvious that the interface is optical, the laser power, transmit wavelength, transmit power, receiver sensitivity, and other features of a SFP module 10 are generally only known if the data sheet for the SFP module is available. Fortunately, a significant amount of important information is encoded into the nonvolatile memory 13 of the SFP module 10. The SFP Check 12 reads this information, decodes it, and displays it to the user preferably via a web browser available from the computer or laptop 14. All files needed to decode the contents of the SFP module 10 memory 13 are contained in a small flash memory 18 on the SFP Check 12, as shown in FIG. 4. The web browser runs locally off the memory of the computer 14; therefore, no connection of the computer 14 to the internet is required. Examples of screens displaying information of an installed SFP module and generated using the local web browser and the files from the flash memory 18 are shown in FIGS. 5 through 12.

Figure 4:
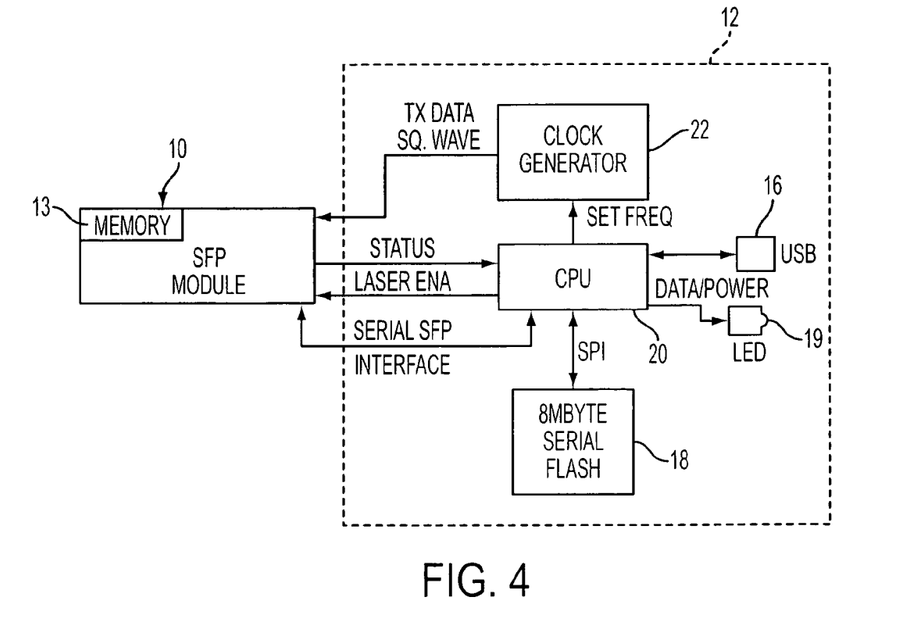
FIG. 4 is a block diagram of a SFP Check in accordance with an illustrative embodiment of the present invention.

As stated above and depicted in FIG. 4, the SFP Check 12 can be connected to the user's PC 14 via the USB port 16. Sufficient power is provided from the computer 14 via the USB port 16 and USB cable 15 to power the SFP Check 12 and the installed SFP module 10 via their respective power supply circuits (not shown). The PC 14 will recognize the SFP Check 12 as a small Flash drive and assign a drive letter just as it does for any Flash drive in accordance with an illustrative embodiment of the present invention described below. The user simply copies the files from the memory 18 of the SFP Check 12 onto the local hard drive of the PC 14 and uses its web browser to open the file called "SFP Check.html" without any connection to the internet.

Figure 13B:
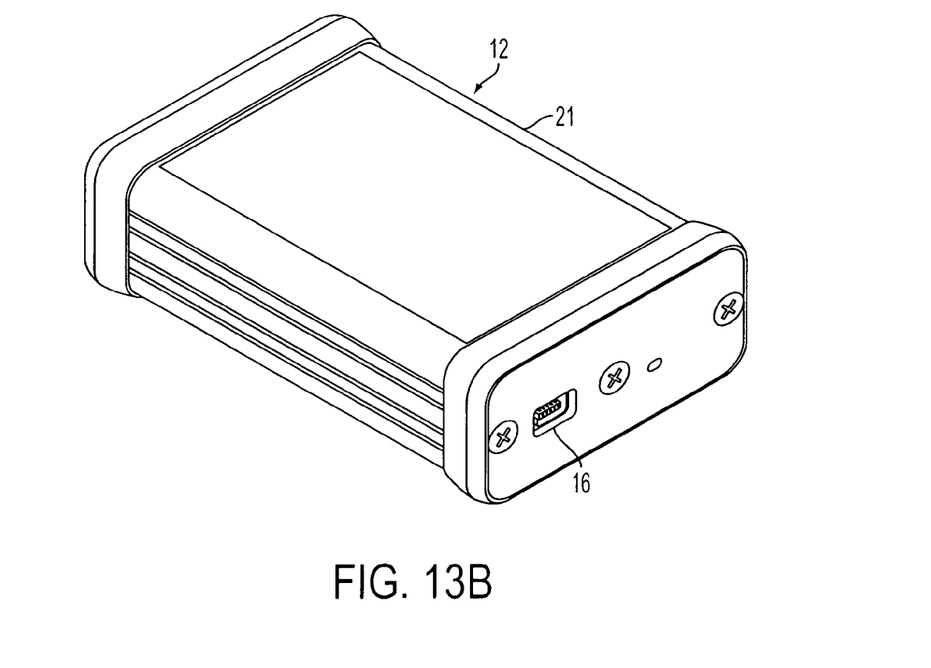

FIGS. 13A and 13B are respective isometric exterior views of a SFP Check 12 in accordance with an illustrative embodiment of the present invention. The SFP Check components (e.g., the components illustrated in FIG. 4 and power supply circuits) are preferably enclosed in a housing 21 having ports 16 and 17, respectively, for receiving a USB cable 15 connector and a SFP module 10 being tested.

The generation of the screens (e.g., FIGS. 5 through 12) permits the user to see the basic features of the SFP module 10 such as the manufacturer's name, serial number, date of manufacture, and other information retrieved and decoded from the SFP module's memory 13. Detailed and raw data is also available from the memory 13 for examination. For some SFP modules 10, there is a diagnostics function that measures temperature, output power, input power, and laser bias current. This information can be used to gauge the overall health of the SFP module 10 or even use a known functioning SFP module to measure the power provided by other optical equipment. Thus, the SFP Check 12 can be used as a low cost optical power meter, even though it may be less accurate than other devices.

An advantage of illustrative embodiments of the present invention is the ability to identify an SFP module 10 from an unsorted set of SFP modules. In a telephone office or any place where there is a substantial amount of optical telecommunications equipment, trying to match various SFP modules 10 to the equipment can be difficult. A typical situation might occur where a shoe box or other container contains many SFP modules 10 and a technician is trying to find a SFP module that is suitable for Gigabit Ethernet and can drive about 10 km of fiber with a wavelength of 1310 nm.

For a particular SFP module 10 connected to the SFP Check 12, a screen or web page 50 (FIG. 5) generated via the web browser and file called "SFP Check.html" indicates that the SFP module 10 currently being read from and decoded by the SFP Check 12 is not the correct optical transceiver or device because it is intended for OC48(2.5 Gbps), the wavelength is 1546.92 nm, and it has a range of 80 km. Thus, the SFP Check 12 conveniently allows a user to quickly connect a SFP module 10 to the SFP Check and determine that the SFP module will not work for the user's intended purpose (e.g., for a Gigabit Ethernet pathway requiring a wavelength of 1310 nm and about 10 km of fiber).

Selecting another device from the box, the user can find a SFP module 12 that does meet the user's requirement. Under capabilities shown in the screen or web page 60 (FIG. 6)

generated by the SFP Check 12, it can be seen as Ethernet type 1000 Base-LX which is 1 Gbps. Under "Reach," it can be seen that the device is intended to drive about 10 km of single mode fiber (SMF).

The Hardware Status and Control table 62 (FIG. 6) depicts the status of 5 electrical connections to the SFP. The SFP PRESENT field indicates if a SFP transceiver module is installed. The Rx Loss of Signal field indicates whether a modulated laser input is detected at the receiver in the SFP module being read from and decoded. In the cases above, a user can see that the receive signal is lost because there was no fiber plugged into the SFP module 10. The Tx FAULT signal field indicates whether the internal laser is functioning properly. The SFP modules 10 are required to have a self-diagnostic feature for the laser. The TxDISABLE field is preferably always 0, and the laser is preferably always on. The TxDISABLE field is shown in the table 62 since a user who understands the SFP electrical interface will probably want to see all the pin states. The Rate Select field corresponds to an old function that is seldom used on modern SFP devices. For some old SFP devices that could operate at two data rates, the SFP device or module needed to know which rate was being applied. Modern SFP modules or devices with multiple rates can therefore optimize their operation automatically The black bar 64 at the top of the screen or web page 60 in FIG. 6 allows the user to navigate to 5 different web pages. Again, these web pages (e.g. page 60) can be generated using the file obtained from memory 18 of the SFP Check 12 and the browser on the computer 14 and without an internet connection. Clicking on the Raw ID Data button brings up a long table (e.g., at least a portion of which is shown in FIG. 7) with 128 rows. Each row presents one byte of data from the SFP memory at addresses 0 to 127 with an interpretation of the contents of each byte. For example, each of the 8 bits at address 6 indicates some variety of Ethernet capability. In this case, only one bit is set indicating 1 Gigabit per second Ethernet intended for single mode fiber. The controlling document which describes the contents of the SFP memory is SFF-8479. The SFP modules are preferably designed and manufactured to industry standards in order to be read by the SFP Check.

Figure 6:
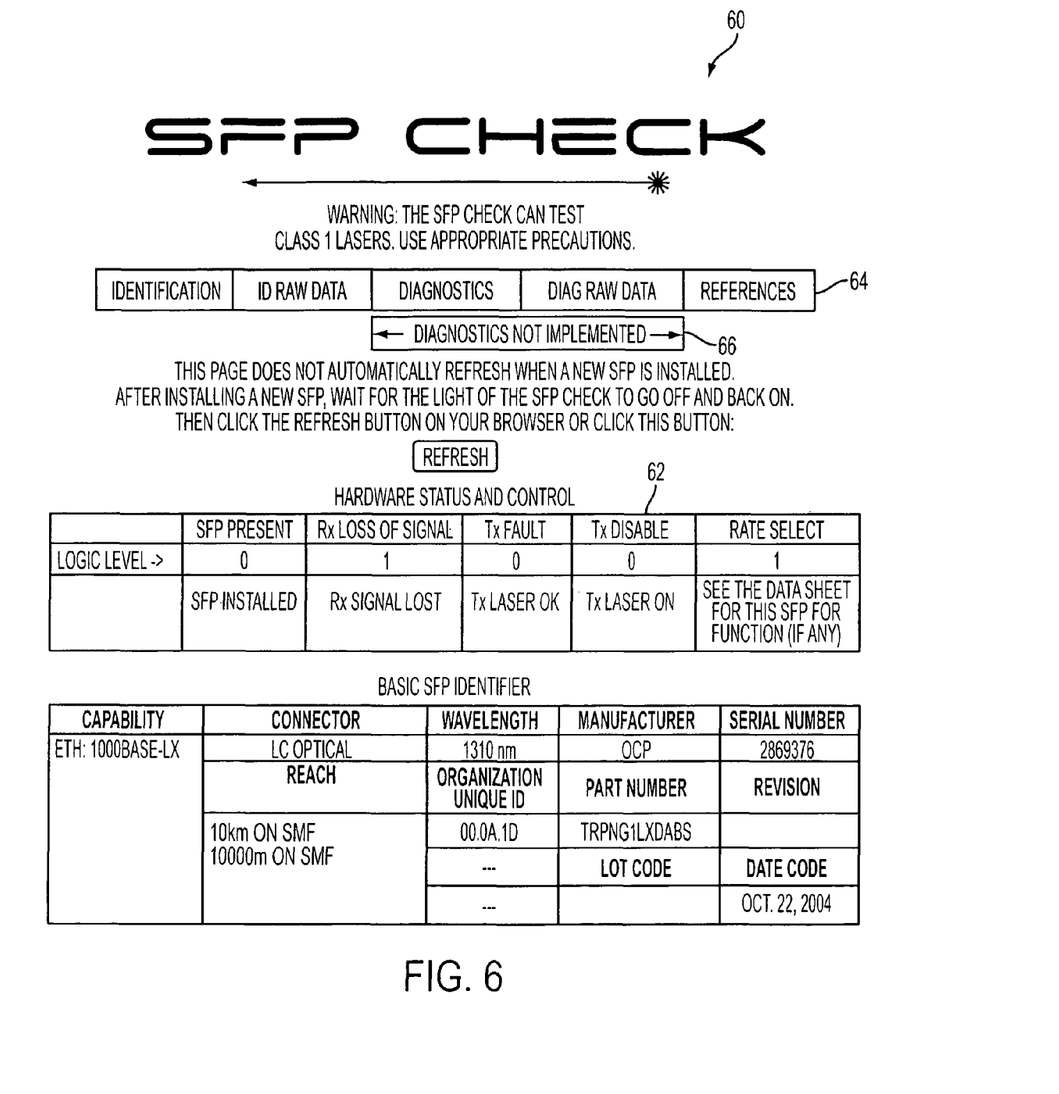
FIG. 6 depicts the startup page which contains identification information for an SFP with Ethernet capability in accordance with an illustrative embodiment of the present invention.
Figure 7:
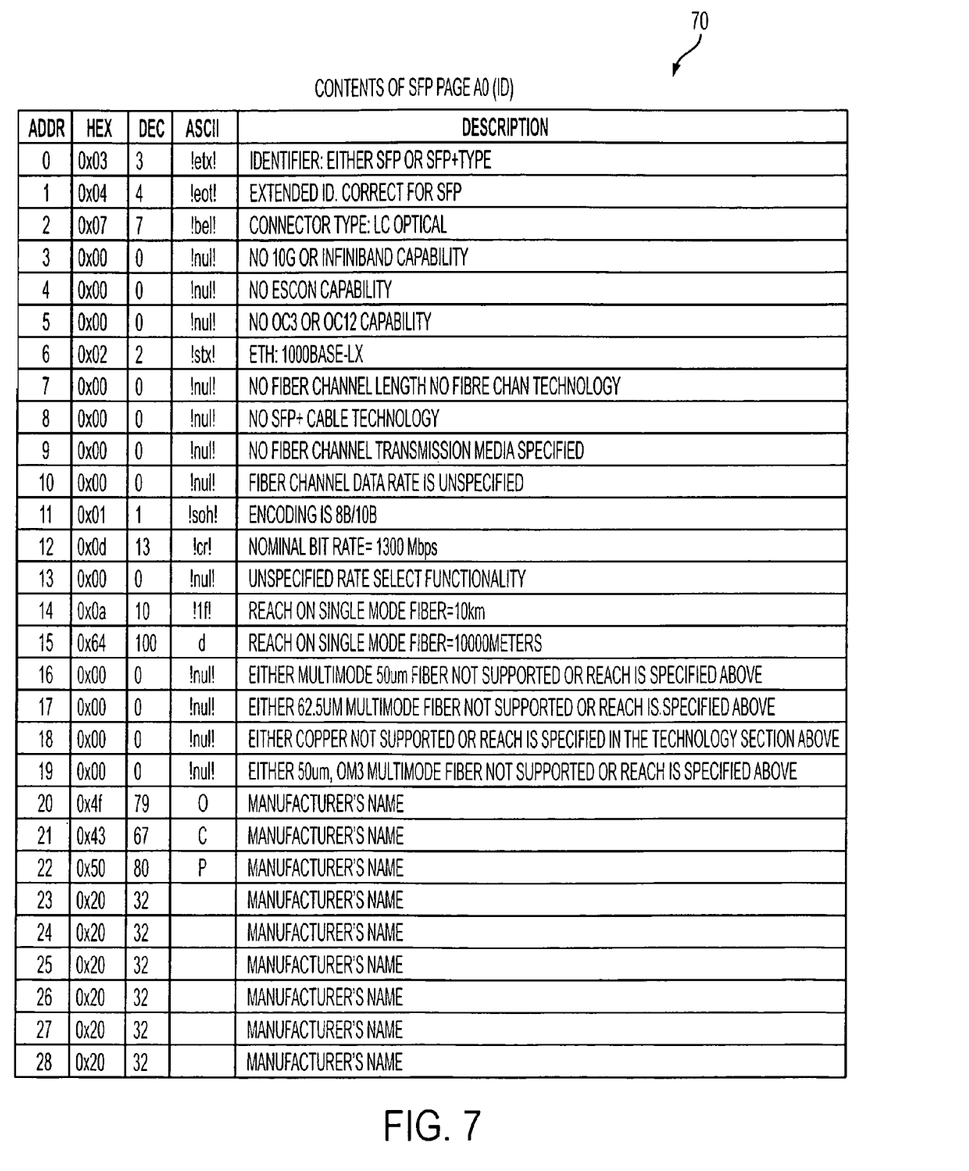
FIG. 7 depicts the beginning of the raw ID data table from the ID Raw Data page in accordance with an illustrative embodiment of the present invention.
Figure 8:
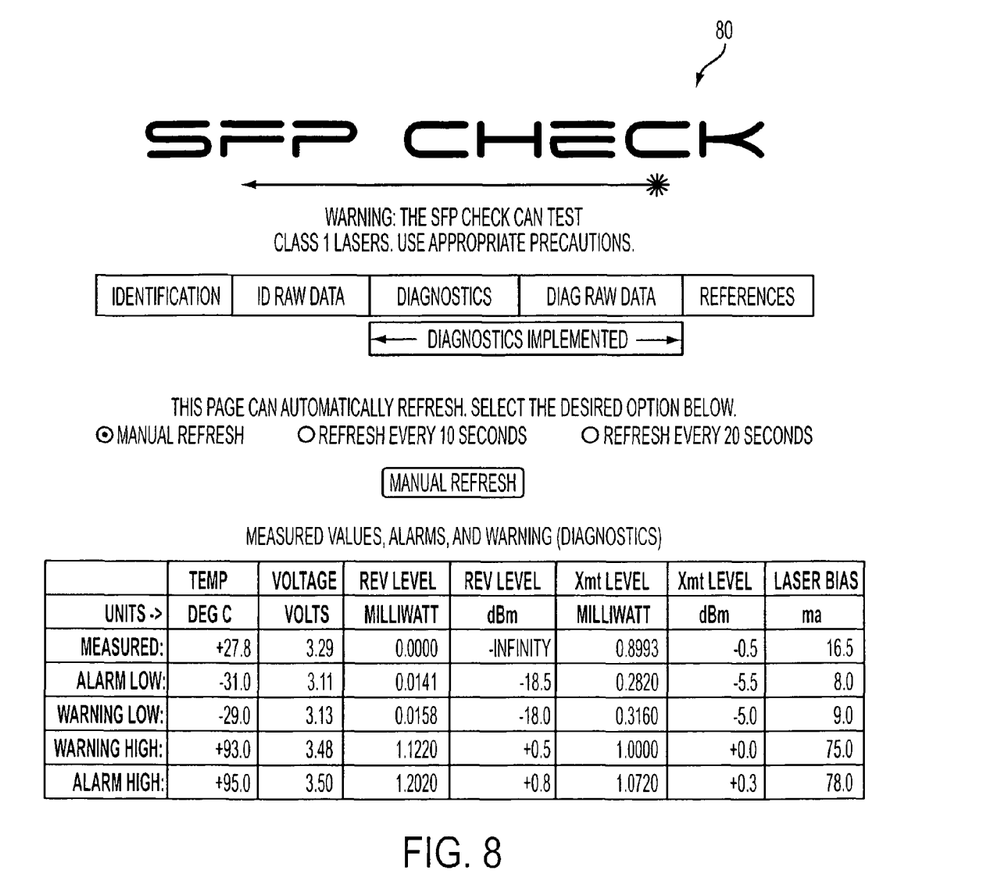
FIG. 8 depicts the Diagnostics page including the presentation of analog values in accordance with an illustrative embodiment of the present invention.

In FIG. 6, there is an indicator 66 just under the black bar 64 of buttons which can say "Diagnostics Implemented" or "Diagnostics not Implemented." Some SFP modules 10 include internal measurements for temperature, voltage level, receive level, transmit level, and laser bias. Other SFP modules 10 do not have this capability. FIG. 8 depicts a typical output 70 from a SFP module 10 which does have diagnostics implemented. Not only are the measurements shown, but there are four thresholds for each measured quantity.

With reference to the Temp column in FIG. 8, the measured temperature is shown as +27.8° C. The Alarm Low level is −31.0° C. A temperature below −31.0° C. would cause the SFP to declare an alarm. The temperature low alarm is a bit which can be read from the diagnostics within the SFP module 10. The warning level is −29.0° C. Another bit is set if the temperature is below the warning level. There are two other bits which can be set for temperature high warning and temperature high alarm. The data sheet for this particular SFP device 10 depicts that the device 10 is guaranteed to operate over the range of −25° C. to +85° C.

There are two columns for receive level in FIG. 8. The actual receive level read from the SFP module 10 is a 16-bit number with units of microwatts. The web page software converts this linear number into the more useful units of decibels referenced to 1 milliwatt (dBm).

The transmit level also has two columns: the actual linear value read from the SFP and the value converted to dBm.

Laser bias is measured in milliamps. It is a measure of the health and age of the transmit laser. As the laser becomes old, more current is required to generate the same amount of output power. When the laser bias exceeds the alarm high level (75 ma for this device) the TX FAULT will be declared. The laser bias of the SFP device 10 in the example above is much closer to the low end than the high end so it can be assumed the device 10 has a long life ahead of it.

Finally, the measured values are expected to change over time. The temperature is expected to increase after the device is initially installed until the temperature stabilizes in 10 to 30 minutes depending on the part and the air flow during the test. The receive level may change due to inserting fibers or even moving fibers. Since these measurements change, there is an option to permit the screen to be updated automatically. The default setting requires the user to update the screen using the manual refresh button. In some cases, the automatic refresh can be annoying.

Figure 5:
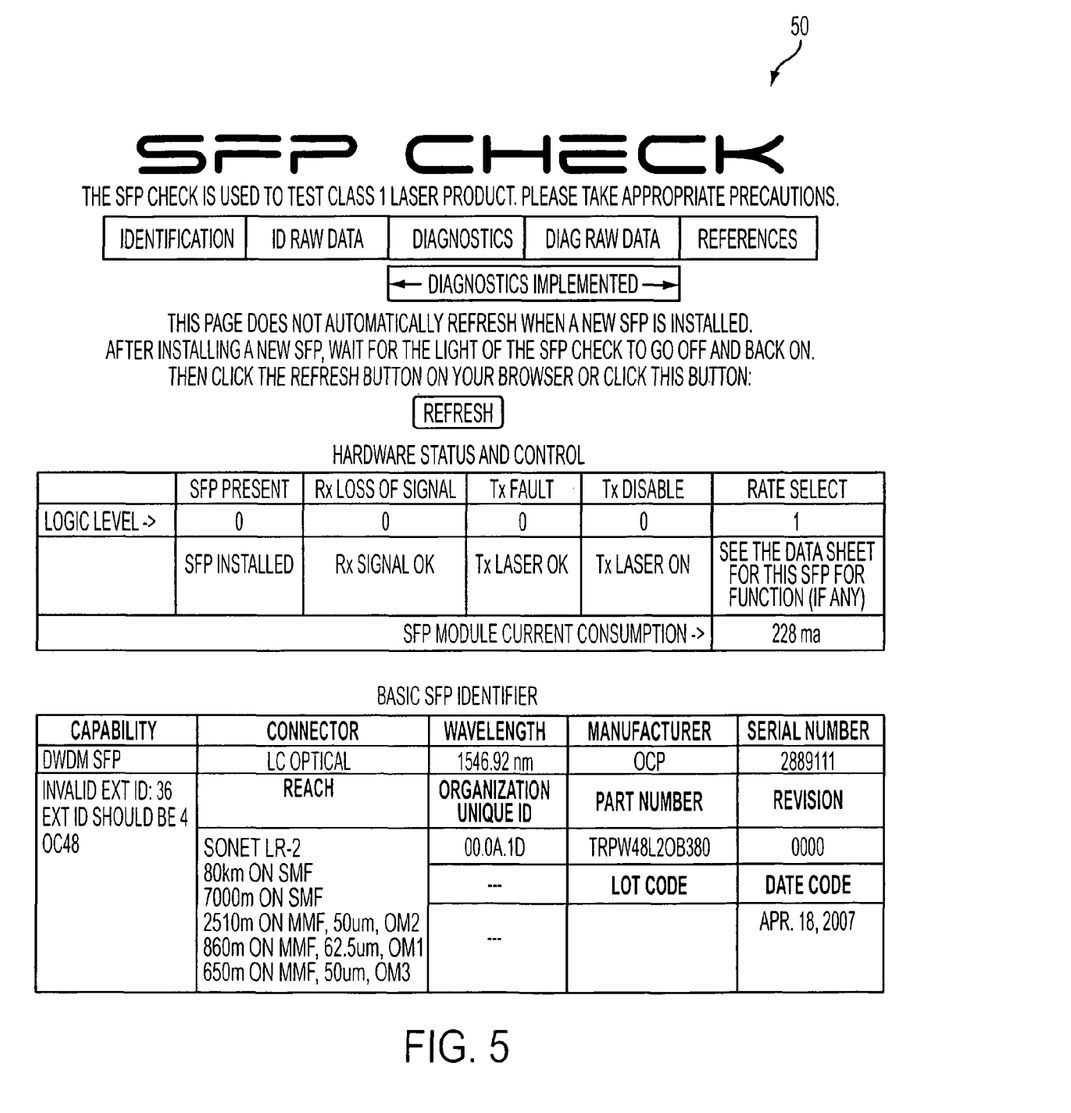
FIG. 5 depicts a startup page which contains identification information for an SFP with OC48 capability in accordance with an illustrative embodiment of the present invention.
Figure 9:
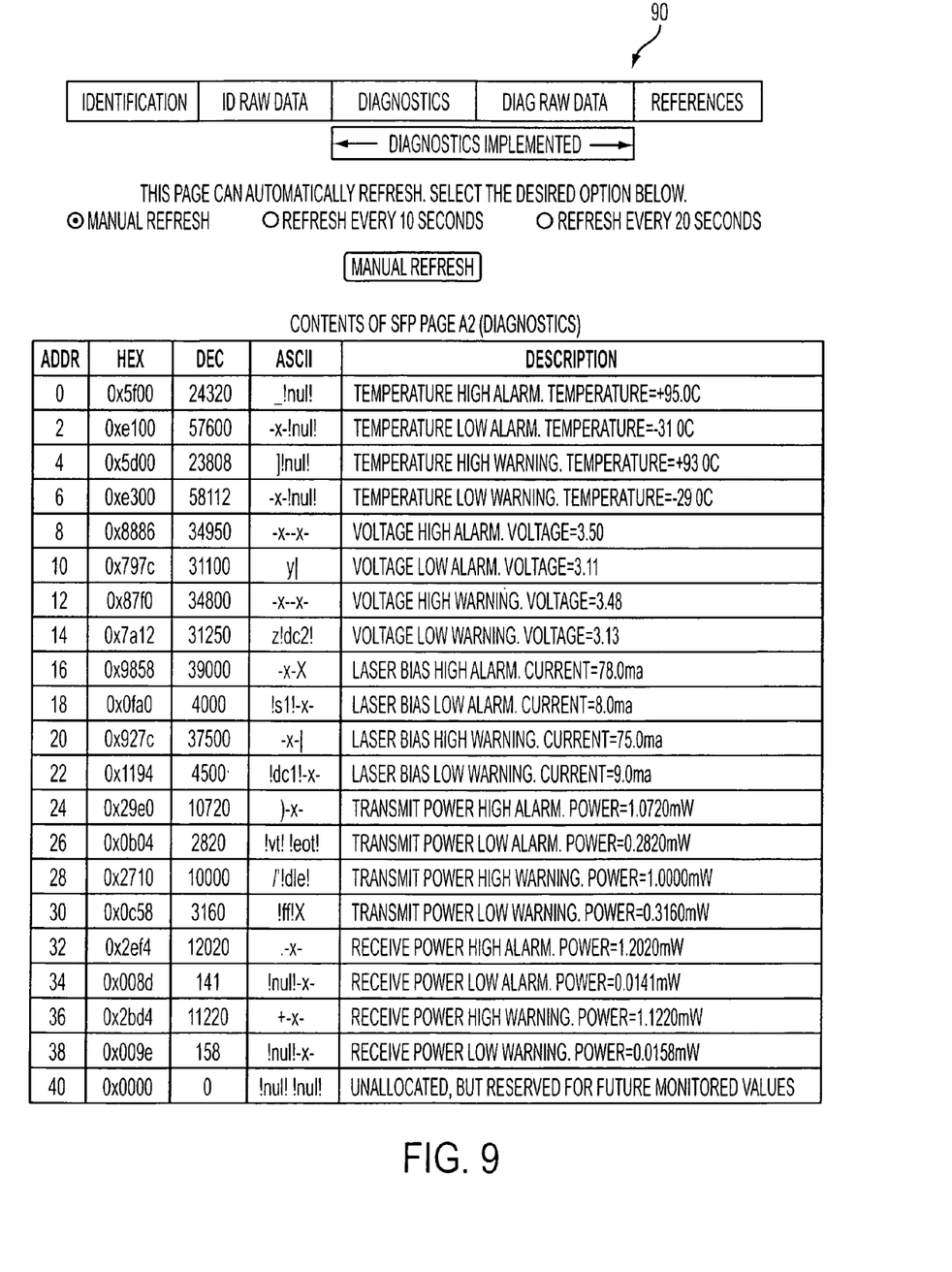
FIG. 9 depicts the beginning of the Raw Diagnostics table with the alarm and warning thresholds in accordance with an illustrative embodiment of the present invention.

With reference to the screen or web page 90 in FIG. 9, the alarm and warning levels from a Diagnostics Page, the Diagnostics Raw Data is displayed. It is a 128 byte table, but each row of the table may describe 1, 2, or 4 bytes at a time. FIG. 5 depicts the first bytes in the table are 16 bit values which describe the alarm and warning levels shown on the diagnostics page.

Figure 10:
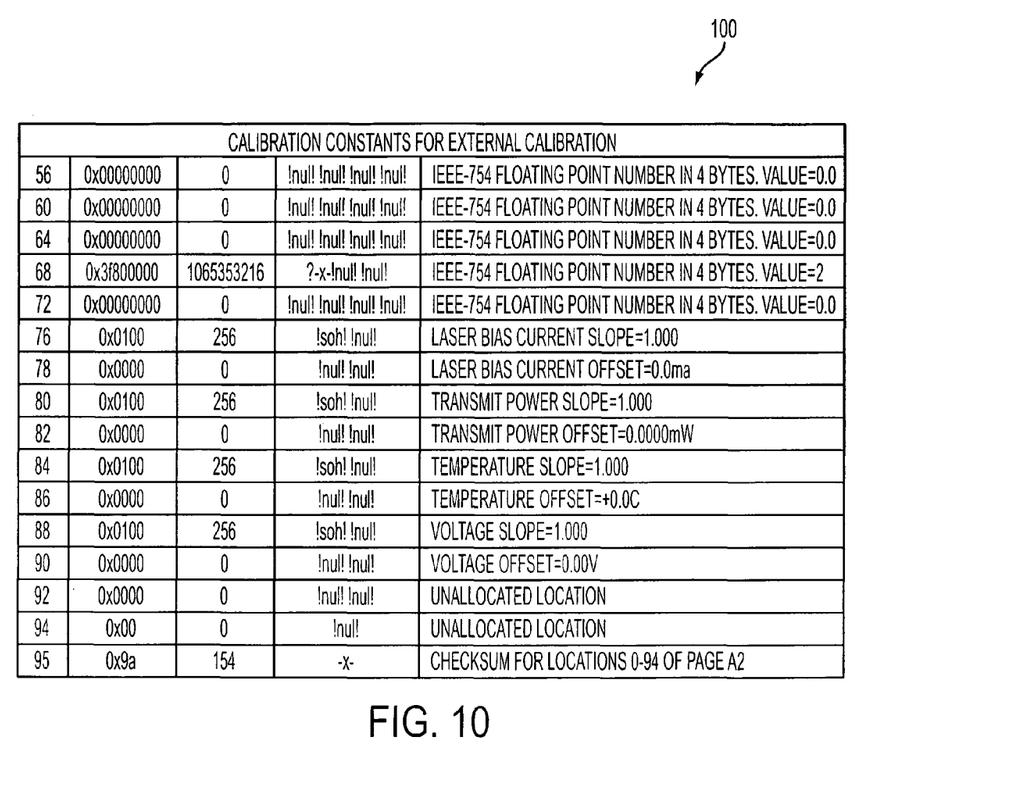
FIG. 10 depicts the calibration data section of the Diagnostics table in accordance with an illustrative embodiment of the present invention.

FIG. 10 depicts calibration data 100 from a Diagnostics table. Some SFP devices provide calibration constants. To compensate for slightly inaccurate measurements, the manufacturers provide a simple gain and offset which can be applied to the actual measured values. The values are usually a 16 bit fractional format. The receive power calibration is an exception. There are 5 values of 32 bit each expressed in single precision floating point format as described in the standard IEEE-754. The equation for using these coefficients implements a fourth order polynomial which permits the correction to have some curvature instead of merely being a straight line.

In the example device, the calibration is performed within the SFP, so the slope is set to 1.0 and the offset is zero. There is a flag in the first memory page at address 92 which indicates whether the calibration is performed within the SFP module 10.

Figure 11:
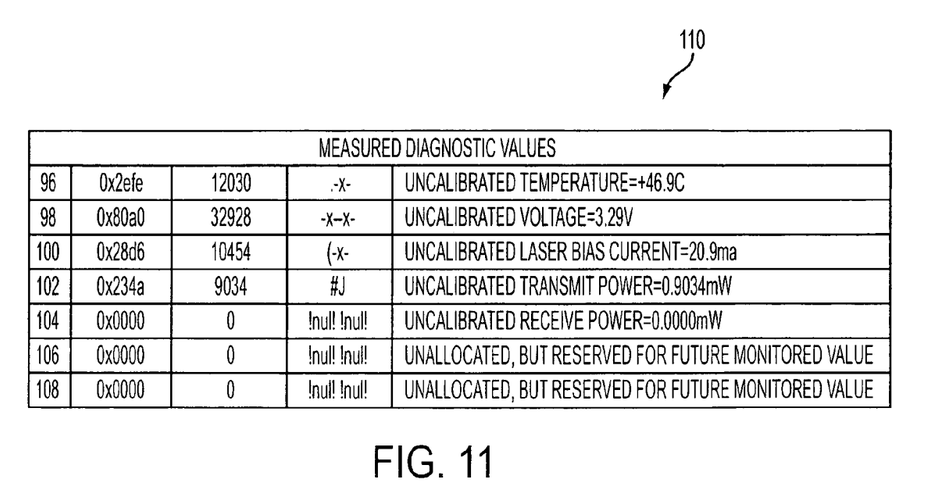
FIG. 11 depicts the actual measured analog data in accordance with an illustrative embodiment of the present invention.

FIG. 11 depicts Measured Diagnostics values 110 from a Raw Diagnostics page. The actual measured values follow the calibration data as shown in FIG. 10.

Figure 12:
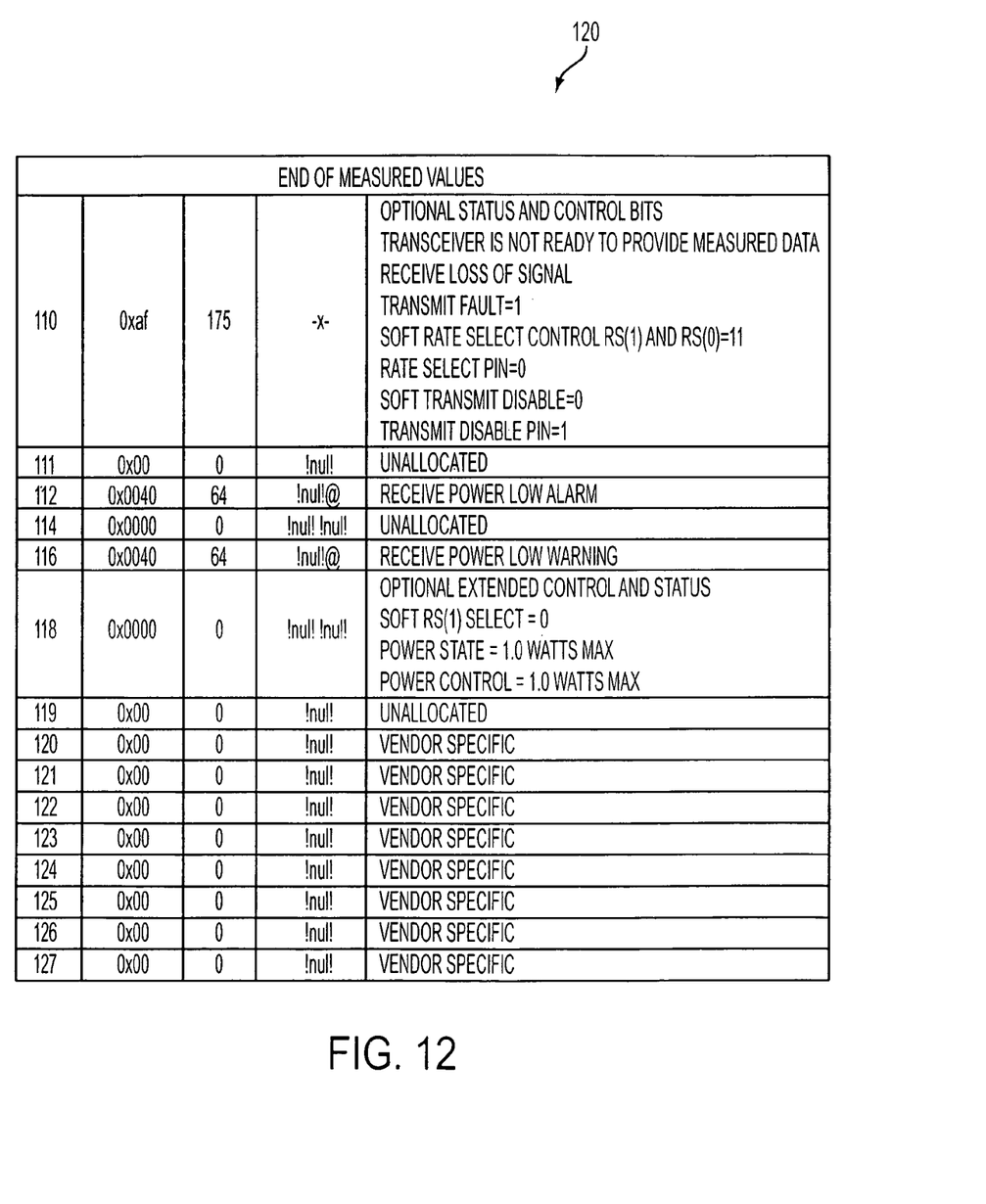
FIG. 12 depicts the last of the diagnostics table including the warning flags and alarm flags in accordance with an illustrative embodiment of the present invention.

FIG. 12 is the last of the illustrative Raw Diagnostics page and provides Optional status, warning flags, and alarm flags, and so on. The last section of the diagnostics page table depicts whether certain options are used, the alarm and warning flags are at words 112 and 116 respectively, and a power specification is at address 118. There is another rate select feature at address 118, but the SFP Check does not exercise it. The last page is presented by clicking the References button. The page provides references to standards, background, contact information, and application hints for the SFP Check.

The SFP Check 12 has a number of advantageous applications. For example, the SFP Check 12 can be used for selection of a SFP module 10 from a collection of SFP modules with unknown characteristics. The SFP Check can be operated from −40° C. to +85° C. This is adequate for temperature testing of SFP modules for most parameters except bit error rate. The incoming inspection of SFP modules can check the coding of the module with an SFP Check 12 prior to being placed into stock. Errors can be found such as the shipment of the wrong module, or the coding in the module could be incorrect. Since a SFP module 10 with digital diagnostics can read received levels, the SFP with the proper optical module installed can be used as a relatively inaccurate, but low cost optical meter. Most SFP modules only have an accuracy of +/−3 dB, but often that is adequate to determine if a signal is present during a field installation or debug. The SFP Check can be used to determine likely age and remaining life of a laser by examining the laser bias current.

With continued reference to FIG. 4, the USB connector 16 interfaces to the PC 14 and receives power from the PC to provide power to the SFP Check 12. The SFP Check 12 appears to be a memory stick to the PC 14. Most accesses simply read or write this memory. The CPU 20 translates USB transactions to memory transactions. There is one file called "sfp.js" which is the 256 byte content of the SFP module 10. It behaves like just another file except it is read only. The clock generator 22 provides a signal to the laser in the SFP module 10 which is appropriate to the data rate of the installed SFP. Without a signal, the laser would not turn on, and it would not be possible to measure the transmit laser function. Existing test devices merely provide a coaxial connector at this location and require the user to stimulate the laser with other test equipment in the lab. The STATUS line shown in FIG. 4 tells the CPU 20 a few things such as the SFP module 10 is installed and Laser fault. The LED 19 is on most of the time to tell the user that the SFP Check 12 is working. It flickers when data is transferred on the USB port 16.

The SFP Check 12 is a device for testing and identifying Small Formfactor Pluggable (SFP) communication transceivers 10. It connects to a PC 14 using the USB port 16 and appears as a flash memory drive to the PC 14. However, there is no way to predict which drive letter will be assigned to the SFP Check 12 or any flash memory drive. In the most common configuration of a PC 14, the C: drive is the local hard drive and the D: drive is a CD/DVD drive. The next letter, E:, would be assigned to the SFP Check 12. However, E: is commonly used for network drives or a second CD/DVD drive. Since the SFP Check 12 operates using HTML and JavaScript files, one solution is to require the user to execute the HTML and Javascript from the SFP Check 12. This works, but it is slower than copying the files to the local hard drive of the PC 14 and running them locally.

Neither HTML, JavaScript, nor Microsoft Windows has any mechanism for locating a drive via the drive label. Drives can only be accessed by drive letter. A drive cannot be accessed without actually accessing a file on that drive. Therefore, a file called "sfp.js" is used in the root directory of the SFP Check 12 as the identifying characteristic of the SFP Check. The code starts looking for "sfp.js" in drive letter "D:". If the file is found, the drive letter "D:" is used. If not found, the drive letter is incremented until the file is found or all the drive letters, through "Z:", are examined without finding it. If the file is not found, an error message can be displayed on the web page or in an alert box.

More specifically, one of the known uses of JavaScript is to place some text in an HTML page depending on some calculation or test. For example, in the SFP Check 12, numerical or text entries in tables are created based on the data read from the SFP module 10. An HTML file calls a function which executes the file "sfp.js." A further function call places the values collected form the SFP memory 13 into an array of 256 bytes. For example, two of these bytes are temperature of the module where one byte indicates the integer temperature in ° C. and the other byte is the fractional part of the temperature. In other words, a line indicates that HTML needs to transfer control to a function that is a JavaScript function. The next line indicates that some text is expected back from the function and that text is placed on the web page.

A Javascript function can be used to add text to an HTML page. Often the JavaScript is in the same file where the HTML is called, but that is not a requirement. The JavaScript can be in a separate file. In accordance with illustrative embodiments of the present invention, a method is provided for finding the file "sfp.js" even when the drive letter is not known. For example, the drive letter could be "E:sfp.js" or "H:sfp.js", or any other drive letter. In accordance with illustrative embodiments of the present invention, a method creates a series of HTML statements that attempt to open "sfp.js" from the root directory of a series of drives. Once the file is successfully opened, no more attempts are created.

JavaScript will detect errors including attempts to access a nonexistent function. There is a programming technique which allows a JavaScript function to handle an error which is also called an exception. An exception will be thrown if a software program tries to call a function that is not known. See the following HTML, for example:

<script type="text/javascript" src="file:///D:\sfp.js"></script>
<script type="text/javascript" init_SFP_str( );> </script>

If the file "sfp.js" does not exist on drive D: or drive D: does not exist, an exception is thrown which can be caught by the software program and processing device implementing the program because a function (init_SFP_str( ), for example) has not been found. However, a function is provided in accordance with illustrative embodiments of the present invention that will return a line such as:

<script type="text/javascript" src="file:///?:\sfp.js"></script> where the "?" is replaced by a drive letter. The function allows the programmed processor to be intelligent enough to know to return no HTML text string if the file is already found. If the sfp.js file has had not yet been found, the function returns the above line or string.

When the process starts, a variable (e.g., drive_letter") is initialized to "D". Another variable (e.g., valid_sfp_check_drive) is set to zero at the beginning of the search process to indicate the drive has not been found. Once the drive is found, it is set to one. A try clause in an initial attempt function (e.g., Attempt_init_access( ) function) executes when the drive has not yet been found. The initial attempt function attempts to call the one function in the "sfp.js" file. If there is an error, a catch clause is executed which increments the drive letter.

If a variable (e.g., "src_drive") is initialized to "D", HTML lines are repeated in sufficient numbers to allow testing of drives D-Z. A first Get_sfp( ) function places the following line in the HTML:

<script type="text/javascript" src="file:///D:\sfp.js"></script>

The Attempt_init_access( ) function may throw an exception which increments the drive letter, or it will not throw an exception and the variable valid_sfp_check_drive will be set to one instead of zero. Once the valid_sfp_check_drive variable is set, the succeeding functions return nothing. If the file is not found, an error message can be displayed on the web page or in an alert box.

Illustrative embodiments of the present invention have been described with reference to a CPU and memory in a SFP Check 12 (e.g., FIG. 4), web pages (e.g., FIGS. 5-12) and web browser used by a computer 14 that need not be connected to the internet. It is to be understood, however, that the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While the invention herein disclosed has been described by means of specific embodiments and applications thereof, numerous modifications and variations can be made thereto by those skilled in the art without departing from the scope of the invention.

What is claimed is:

1. A testing apparatus for small form factor pluggable or SFP devices comprising:
    an interface for connecting to an SFP device, the interface being configured to connect to any one of a plurality of SFP-types and regardless of whether the SFP-type is unknown prior to connecting;
    a connector configured to connect the testing apparatus to a computer and receive power for the testing apparatus and the SFP device from the computer; and
    a processing device configured to read information from a memory device in the SFP device, decode the information, and store the information in at least one file;
    wherein the processing device is programmed via an SFP device reader software application to provide the file to the computer, and to provide the computer with instructions to access the file and to display at least a portion of the information provided in the file on a computer display.

2. A testing apparatus as claimed in claim 1, wherein the connector is a USB connector.

3. A testing apparatus as claimed in claim 1, wherein the SFP device reader software application is configured to run from the testing apparatus.

4. A testing apparatus as claimed in claim 1, wherein the SFP device reader software application is configured to instruct the computer to run a browser from the computer without connection to a network to access the file provided via the SFP device reader software application.

5. A testing apparatus as claimed in claim 4, wherein the SFP device reader software application is configured to instruct the computer to generate HTML pages without connection to a network to indicate the SFP device characteristics using the information obtained from the memory device in the SFP device.

6. A testing apparatus as claimed in claim 4, wherein SFP-type of SFP device is determined from the HTML pages.

7. A testing apparatus as claimed in claim 1, wherein the connector is configured to deliver power the testing apparatus and the SFP device under test from the computer.

8. A testing apparatus as claimed in claim 1, wherein the SFP device reader software application indicates the testing apparatus as a memory stick to the computer.

9. A testing apparatus as claimed in claim 1, further comprising a housing unit, wherein the interface comprises a second connector provided on the housing unit to connect to the SFP device, and the housing unit encloses the testing apparatus and the connector and second connector are ports to the housing unit.

10. A testing apparatus as claimed in claim 9, wherein the testing apparatus enclosed in the housing unit is portable.

11. A testing apparatus as claimed in claim 9, wherein the housing unit comprises a power circuit to power components in the testing apparatus components and the SFP device under test.

12. A testing apparatus as claimed in claim 1, wherein the SFP device reader software application is operable to assign the testing apparatus a drive letter and operate the testing apparatus as a small Flash drive when the SFP device is connected to the interface.

13. A testing apparatus as claimed in claim 1, wherein the SFP device reader software application is operable to control the computer to generate at least one screen on the computer display to indicate at least part of the information read from the memory device in the SFP device.

14. A testing apparatus as claimed in claim 1, wherein the testing apparatus comprises a clock generator to provide a signal to the SFP device to turn on a laser in the SFP device, the processing device being configured to measure transmit laser function of the laser when the laser is turned on.

15. A testing apparatus as claimed in claim 1, wherein the SFP device reader software application provides the computer with instructions to access the file by attempting to open the file from each of a series of drive letters until the file is successfully opened.

16. A testing apparatus as claimed in claim 6, wherein the SFP-type can be at least one of manufacturer, part number, wavelength, reach, receive status, transmit status, receive level, transmit level, voltage level, temperature, laser bias, and characteristics encoded into the SFP device.

* * * * *